(12) United States Patent
Avenel

(10) Patent No.: US 6,636,728 B1
(45) Date of Patent: Oct. 21, 2003

(54) PORTABLE MULTI-ANTENNA SIGNAL RECEIVER

(75) Inventor: Jean-Jacques Avenel, Chennevieres (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/544,138

(22) Filed: Apr. 6, 2000

(30) Foreign Application Priority Data

Apr. 7, 1999 (FR) .............................. 99 04326

(51) Int. Cl.$^7$ ................................. H04B 1/06
(52) U.S. Cl. ...................... 455/277.1; 455/90; 455/274; 375/258; 343/788
(58) Field of Search .................. 455/90, 101, 102, 455/277.1, 277.2, 562, 274; 343/700 R, 702, 729, 713, 788, 742; 375/258

(56) References Cited

U.S. PATENT DOCUMENTS 6,192,256 B1 * 2/2001 Whinnet ..................... 455/562
6,463,295 B1 * 10/2002 Yun .......................... 455/562
6,501,943 B1 * 12/2002 Ide et al. .................... 455/101

FOREIGN PATENT DOCUMENTS

| FR | A 2763186 | 4/1998 | |
| WO | WO 98/07244 | * 2/1998 | ............ H04B/7/08 |
| WO | WO 98/20626 | 5/1998 | |

* cited by examiner

Primary Examiner—Nay Maung
Assistant Examiner—Tanmay Lele
(74) Attorney, Agent, or Firm—Liniak, Berenato & White

(57) ABSTRACT

A portable receiver comprised of several antennas that are connected to a receiver unit for receiving a signal transmitted by an electromagnetic induction process. The antennas are made in the form of coils, that are carried by a support in such a way that the respective turns of the coils are oriented along different respective axes of an axis system associated with the support. The invention further includes a phase shifting means oriented between the antennas and the receiver unit. The phase shifting means is designed to produce a temporal phase shift corresponding to an angle of $(n-1)\pi/n$, at the frequency of the signal received between induced signals delivered by the antennas (n being the number of antennas).

11 Claims, 2 Drawing Sheets

US 6,636,728 B1

PORTABLE MULTI-ANTENNA SIGNAL RECEIVER

CROSS REFERENCE TO RELATED APPLICATIONS

Applicant claims priority to French patent application 9904326 filed Apr. 17, 1999.

BACKGROUND OF THE INVENTION

1. Field of the Invention

The present invention relates to a portable receiver of the type comprising several antennas which are connected to a receiver unit for receiving a signal transmitted by electromagnetic induction, said antennas being made in the form of coils which are carried by a support in such a way that the respective turns of said coils are oriented along different respective axes of a reference axis system associated with said support.

2. Description of the Related Art

Portable receivers of the kind indicated above can be used especially in an anti-theft system for motor vehicles. In this case, the signal receiver is usually incorporated into what is called an "identifier", which is intended to be carried by the owner of the vehicle or by an authorized person and which may furthermore include a signal transmitter placed on the same support as the signal receiver. This support may, for example, be made in the form of a smart card or in the form of a card incorporated into a badge, into the head of the contact key of a motor vehicle or into other articles likely to be carried by the owner of the motor vehicle or by a person authorized to drive the vehicle. Thus, signals may both be received by the identifier from an identification unit, forming part of the anti-theft system and located on board the vehicle, and be transmitted by the identifier to said identification unit.

Under these conditions, when a driver wishes to enter his vehicle, a dialogue between the identification unit and the identifier is established in a known manner. If the identification unit detects the presence of a correct identifier in a known manner, for example by comprising a code transmitted by the identifier with a reference code prerecorded in a memory of the anti-theft system, the identification unit, should the two codes be identical, transmits an authorization signal which can be used to authorize or carry out one or more functions of the motor vehicle, for example to unlock the door locks of the motor vehicle and/or release an engine-immobilizer system.

At the present time, the problem of how to achieve reception homogeneity of the signals by an identifier placed in the magnetic field transmitted by the antenna of the transmitter-receiver of the identification unit located on board the vehicle is well known. In other words, the signal received by the receiver of the identifier should have as large and as constant an amplitude as possible, whatever the position and/or orientation of the identifier in space, corresponding to the working range of the transmitter of said identification unit.

To solve this problem, a first known solution consists in generating what is called a "rotating field" on the transmission side, that is to say within the identification unit located on board the vehicle. For this purpose, an antenna, two coils are used, the axes of revolution of and the currents flowing through said coils are offset by 90°. This is relatively easy to achieve if the modulation used for transmitting the digital data is of the OOK type (on-off modulation). However, if the modulation is of the PSK type (frequency shift modulation) or FSK type (phase shift modulation), the phase between the two currents flowing through the respective coils must be kept constant. This means that almost identical RLC circuits have to be used so that, during the transitions (changes in value of the data), the phases remain coherent. This is difficult to achieve, particularly in high-volume mass production.

It is also possible to produce a "rotating field" on the reception side, that is to say within the receiver of the identifier, by making the latter, for example, as shown schematically in FIG. 1 of the appended drawings. FIG. 1 shows an identifier 1 made, for example, in the form of a card 2 (the support) which may have the dimensions of a smart card and which carries two antennas 3 and 4, a receiver unit 5 and, optionally, a transmitter unit 6 which may also be provided on the card 2. Each of the two antennas 3 and 4 is made in the form of a coil L1 and L2, which coil is preferably wound on a core 7 or 8, preferably made of ferrite, and is electrically connected to the receiver unit 5 and, where appropriate, to the transmitter unit 6 if one has been provided. The turns of the two coils L1 and L2, or more precisely the normals to the surfaces of the turns of the two coils L1 and L2, are oriented along the axes 9 and 11, respectively, these being perpendicular to each other and lying in the plane of the card 2. The two antennas 3 and 4 may be antennas tuned to the frequency of the signal to be received. In this case, capacitors C1 and C2 are connected in parallel to the coils L1 and L2, respectively, in order to form, with the latter, parallel resonant RLC circuits, R being the resistance of the coil L1 or L2, L being its inductance and C being the capacitance of the capacitor C1 or C2.

Under these conditions, when the card 2 is in a magnetic field H which varies with time, for example an alternating magnetic field produced by the antenna of the transmitter-receiver of the identification unit located on board a motor vehicle, the two RLC circuits of the card 2 described above constitute two channels for receiving the carrier wave of the signal transmitted by said identification unit and for sending it to the receiver unit 5 of the card 2. The problem in this case is the electronic processing of the two channels. The voltages or electromotive forces induced in the two coils L1 and L2 may, in certain positions of the card 2 with respect to the direction 12 of the magnetic field H, be in phase or in phase opposition. It is therefore not possible to make a direct summation of the two voltages by putting the two RLC circuits in series, since there are cases in which the resultant voltage would be zero.

This is because, assuming that the card 2 lies in the Ox-Oy plane of an orthonormal fixed coordinate system Ox, Oy, Oz, that the direction 12 of the magnetic field H is parallel to the Ox axis of said orthonormal coordinate system and that the induction B is given by the formula:

$$B = B_0 \sin \omega t \tag{1}$$

in which $B_0$ is a constant that depends on the intensity of the magnetic field H and on the permeability $\mu$ of the medium, in particular the permeability of the core 7 or 8, and $\omega$ is the angular frequency of the carrier wave of the signal transmitted by the identification unit, the magnetic flux $\phi_1$ which passes through the coil L1 is, as is well known, given by the formula:

$$\phi_1 = B_0 S_1 \cos \alpha \sin \omega t \tag{2}$$

in which $S_1$ is the area of the turns of the coil L1 and $\alpha$ is the angle that the axis 9 of the coil L1 makes with the direction 12 of the field H (FIG. 1 shows one particular position of the card 2 in which the angle α here is equal to π/2). It is also known that the electromotive force $e_1$ induced in the coil L1 is given by the formula:

$$e_1 = \frac{d_1}{dt} = B_0 S_1 \omega \cos\alpha \cos\omega t \tag{3}$$

Likewise, the electromotive force $e_2$ induced in the coil L2, the axis 11 of which makes an angle of π/2 with respect to the axis 9 of the coil L1, is given by the following two formulae:

$$e_2 = \frac{d_2}{dt} = B_0 S_2 \omega \cos\left(\frac{\pi}{2} - \alpha\right)\cos\omega t \tag{4}$$

$$e_2 = B_0 S_2 \omega \sin\alpha \cos\omega t \tag{5}$$

Assuming that the two areas $S_1$ and $S_2$ are equal and writing $$B_0 S_1 \omega = B_0 S_2 \omega = K \tag{6}$$

we then obtain the following formulae for $e_1$ and $e_2$:

$$e_1 = K \cos\alpha \cos\omega t \tag{7}$$

$$e_1 = K \sin\alpha \cos\omega t \tag{8}$$

from which it follows that $$e_1 - e_2 = K (\cos\alpha - \sin\alpha)\cos\omega t \tag{9}$$

It may therefore be seen that if the card 2 is rotated about the Oz axis, there are two positions for which the difference $e_1 - e_2$ becomes zero at any instant. These two positions are the positions in which the angle α is equal to π/4 or 5π/4, for which positions the difference (cos α−sin α) is zero. For both these positions of the card 2 in the Ox-Oy plane, no signal can be received by the receiver unit 5. The same would have applied if, instead of taking the difference between the voltages $e_1$ and $e_2$, their sum had been taken, except that, in this case, the two positions for which the sum is zero correspond to values of α equal to 3π/4 and 7π/4.

Likewise, if the card 2 lies in the Ox-Oz plane, and if the card is rotated about the Oy axis, there are again two positions of the card 2 for which the sum or the difference of the voltages $e_1$ and $e_2$ is zero. Finally, if the card 2 lies in the Oy-Oz plane, the voltages $e_1$ and $e_2$ are both zero and, in this case, no signal can be received by the receiver unit 5 whatever the position of the card 2 in the Oy-Oz plane or in a plane parallel to this plane.

Document FR-A-2,763,186 describes a portable signal receiver, in which the abovementioned drawbacks may be avoided, at least in some cases. In that document, the signal receiver is made in the form of a card similar to that shown schematically in FIG. 5 of the appended drawings. This card is itself similar to that already described with reference to FIG. 1 and furthermore includes a third antenna 13 which is, for example, made in the form of an air coil L3, but which may also be provided with a ferrite core if so desired. The turns of the coil L3, or the normal to their surface, are oriented in a direction 14 perpendicular to the plane of the card 2. As shown in FIG. 4 of the aforementioned document, an amplifier is associated with each of the three antennas in order to amplify the voltage induced in the coil of the corresponding antenna and the amplified voltages supplied by the three amplifiers are summed in an adder, the output of which is connected to the receiver unit carried by the card.

Under these conditions, assuming that the card 2 lies in the Ox-Oy plane of an orthonormal trihedron Ox, Oy, Oz and that the magnetic field generated by the transmitting antenna located on board a motor vehicle is parallel to the Oz axis of said orthonormal trihedron, the voltages induced in the coils L1 and L2 of the two antennas 3 and 4 will be zero, while the voltage induced in the coil L3 of the third antenna 13 will be a maximum. The same would of course apply in the case of any position of the card 2 in space, in which its plane is perpendicular to the direction of the magnetic field generated by said transmitting antenna. A three-antenna arrangement therefore makes it possible to solve one of the reception problems described above with regard to the two-antenna card 2 shown in FIG. 1.

However, when the direction of the magnetic field generated by the transmitting antenna is parallel to the plane of the card 2, the voltage induced in the third antenna 13 is zero and, even in the case of this three-antenna card, there are positions of the card in which the sum or the difference of the two voltages induced in the coils L1 and L2 is zero. Thus, there are still positions of the card 2 in which it is impossible for the receiver unit of the card to receive any signals. This drawback may be avoided in a second embodiment of the portable receiver described in the aforementioned document FR-A-2,763,186, in which, instead of the aforementioned adder, a maximum detector is provided which transmits only the largest of the three voltages induced in the coils of the three antennas to the receiver unit.

Nevertheless, with both embodiments described in the aforementioned document, the problems of how to achieve reception homogeneity are solved only at the price of a relatively high degree of complexity in the hardware (three antennas, three amplifiers and an adder or a maximum detector). This known solution is therefore both bulky and expensive in terms of components and, above all, it increases the standby currents so that it is also expensive in terms of electric energy consumed.

SUMMARY OF THE INVENTION

The object of the present invention is therefore to provide a portable receiver of the type defined in the preamble, which is simpler and less expensive and which consumes less energy than the known portable receiver.

The portable receiver according to the invention is distinguished by the fact that it furthermore includes, between said antennas and said receiver unit, means for producing a temporal phase shift between the induced signals delivered respectively by said antennas, said phase shift corresponding to an angle of (n−1) π/n at the frequency of the signal to be received, n being the number of antennas.

According to one embodiment of the invention, in which two antennas are provided, the coils of which have their respective turns oriented at 90° to each other, a first of the two antennas is connected to a first phase-shifter circuit which phase-shifts the induced signal delivered by the first antenna by +45°, while the second antenna is connected to a second phase-shifter circuit which phase-shifts the induced signal delivered by the second antenna by −45°. The two phase-shifter circuits may consist of simple RC circuits, as will be seen in detail later. In this embodiment, if the magnetic field generated by the transmitting antenna located on board the motor vehicle is parallel to the plane of the card, the voltages V1 and V2 induced in the coils of the two antennas, and phase-shifted by +π/4 and −π/4 respectively, may be expressed by the following formulae:

$$V1 = K\cos\alpha\cos\left(\omega t + \frac{\pi}{4}\right) \quad (10)$$

$$V2 = K\sin\alpha \cdot \cos\left(\omega t - \frac{\pi}{4}\right) = K\sin\alpha\sin\left(\omega t + \frac{\pi}{4}\right) \quad (11)$$

hence:

$$V1 - V2 = K\cos\alpha\left[\cos\left(\omega t + \frac{\pi}{4}\right) - \sin\alpha\sin\left(\omega t + \frac{\pi}{4}\right)\right]. \quad (12)$$

$$V1 - V2 = K\cos\left(\omega t + \frac{\pi}{4} + \alpha\right) \quad (13)$$

From formula (13), it may therefore be seen that the difference between the voltages V1 and V2 has a constant modulus K and is simply phase-shifted by ($\pi/4+\alpha$) with respect to the signal of angular frequency $\omega$ or of frequency f ($\omega=2\pi f$) which has given rise to it. Under these conditions, the receiver unit will be able to receive a signal whatever the value of the angle $\alpha$, that is to say whatever the position of the card in any plane parallel to the direction of the magnetic field transmitted by the transmitter antenna located on board the motor vehicle.

In a second embodiment of the present invention, in which two antennas are also provided, the coils of which have their respective turns oriented at 90° to each other, a first of the two antennas may be electrically connected directly to a first output terminal, while the second antenna may be connected to a second output terminal via a phase-shifter circuit which phase-shifts the induced signal delivered by the second antenna by 90°. The phase-shifter circuit may consist of a delay line designed to introduce a delay of ¼f, being the frequency of the signal to be received.

In this case, it may again be shown that the difference between the voltages V1 and V2 (V2 being phase-shifted by $+\pi/2$ with respect to V1) is given by the formula:

$$V1-V2 = K\cos(\omega t - \alpha) \quad (14)$$

Here again, it may be seen that the difference voltage V1–V2 has a constant modulus K whatever the value of the angle $\alpha$, and therefore whatever the orientation of the card in any plane parallel to the direction of the magnetic field transmitted by the transmitting antenna.

The first and second embodiments of the invention described above make it possible to solve the problem of how to achieve reception homogeneity when the plane of the card is parallel to the direction of the magnetic field generated by the transmitting antenna located on board the motor vehicle. However, the problem is not solved when the plane of the card is perpendicular to said magnetic field. In the latter case, the problem can be solved in a manner known per se using three antennas, the coils of which have their respective turns oriented in directions which are perpendicular to one another in pairs. In this case, said temporal phase-shifting means may be designed to produce a phase shift of 120° between the three induced signals derived by the three antennas, respectively. Said phase-shifting means may comprise delay lines. In particular, if one of the antennas is connected directly to a first output terminal and the other two antennas are in cascade with respect to a second output terminal, two delay lines may be provided which are placed between the second and third antennas and between the third antenna and the second output terminal, respectively, the two delay lines being designed to introduce a delay of ⅓f and a delay of ⅔f respectively, f being the frequency of the signal to be received.

In the three embodiments of the portable receiver according to the invention, the aforementioned first and second output terminals may be electrically connected to the inputs of a differential amplifier, the output of which is electrically connected to said receiver unit.

Further features and advantages of the invention will emerge in the course of the description which follows, given with reference to the appended drawings in which:

DETAILED DESCRIPTION OF THE PREFERRED EMBODIMENTS

Figure 1:
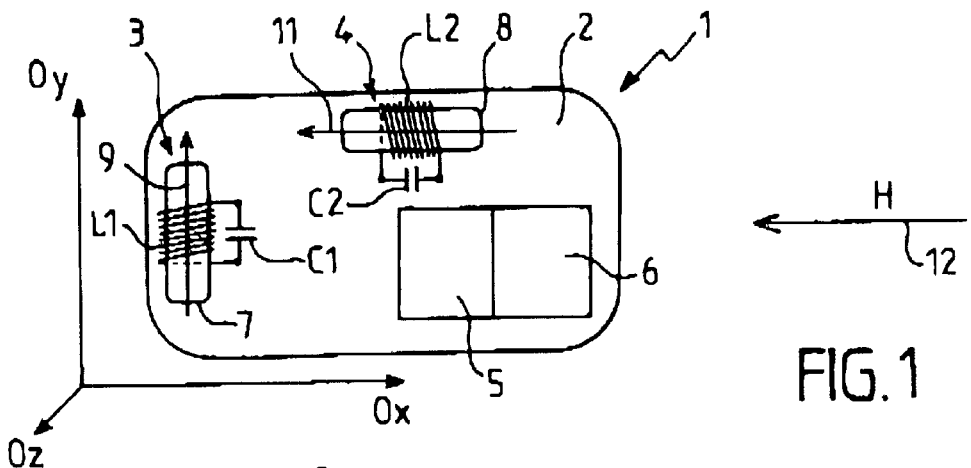
FIG. 1 is a front view showing schematically a two-antenna portable receiver to which the present invention is applicable.

Since the portable receiver 1 illustrated in FIG. 1 has already been described above, it will not be described again in detail. It should simply be noted that, to solve the problem of how to achieve reception homogeneity, phase-shifter means 15 (FIG. 2) are inserted, on the one hand, between the two antennas 3 and 4 and, on the other hand, the receiver unit 5 (not shown in FIG. 2).

Figure 2:
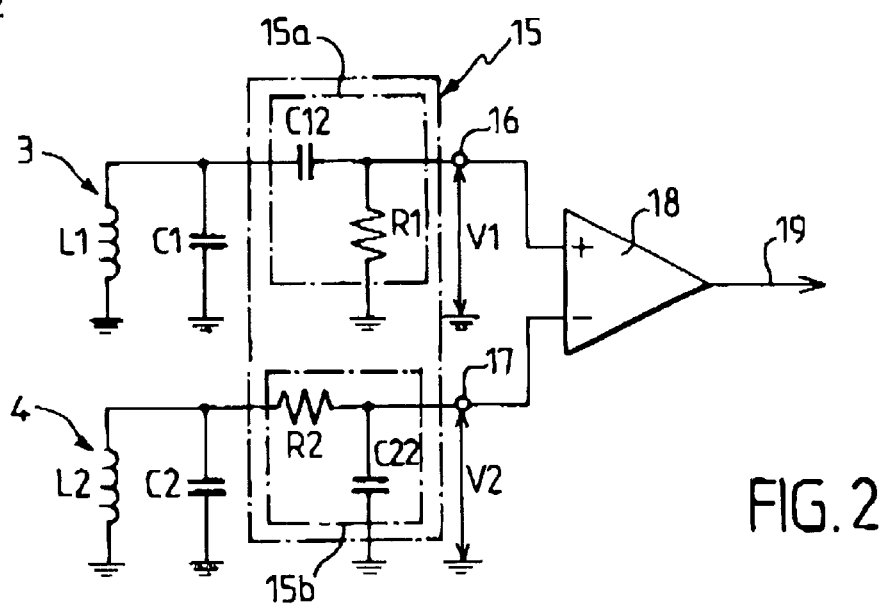
FIG. 2 is a circuit diagram showing a first embodiment of phase shifter means that can be used with the portable receiver of FIG. 1.

In the embodiment in FIG. 2, the phase-shifting means 15 comprises two phase-shifter circuits 15a and 15b which are respectively associated with the two antennas 3 and 4 tuned to the frequency f of the signal to be received. The output or non-grounded side of the tuned antenna 3, which is formed by the coil L1 and by the capacitor C1, is connected to one of the plates of a capacitor C12 of the phase-shifter circuit 15a, the other plate of which is connected, on the one hand, to an output terminal 16 and, on the other hand, to one of the ends of a resistor R1, the other end of which is grounded. On the other side, the output of the other tuned antenna 4, which is formed by the coil L2 and by the capacitor C2, is connected to one of the ends of a resistor R2 of the second phase-shifter circuit 15b, the other end of which is connected, on the one hand, to another output terminal 17 and, on the other hand, to one of the plates of a capacitor C22, the other plate of which is grounded.

If the filters R1, C12 and R2, C22 thus formed have their cutoff frequency equal to the central frequency of the antenna 3 or 4, the first phase shifter 15a produces a phase shift of +45° and the second phase shifter 15b produces a phase shift of −45°. Under these conditions, if the direction 12 of the aternating magnetic field H generated by an antenna located on board a motor vehicle is parallel to the plane of the card 2, the voltages V1 and V2, which are available on the output terminals 16 and 17 respectively, are given respectively by the formulae (10) and (11) indicated above.

The two output terminals 16 and 17 may, for example, be connected to the inputs of a differential amplifier 18, the output 19 of which may be connected to the receiver unit 5 carried by the card 2 of FIG. 1. In this case, the difference voltage V1–V2 available on the output 19 is given by formula (13) indicated above.

The two resistors R1 and R2, the two capacitors C12 and C22 and the differential amplifier 18 may be easily incorporated on the card 2 of FIG. 1.

Figure 3:
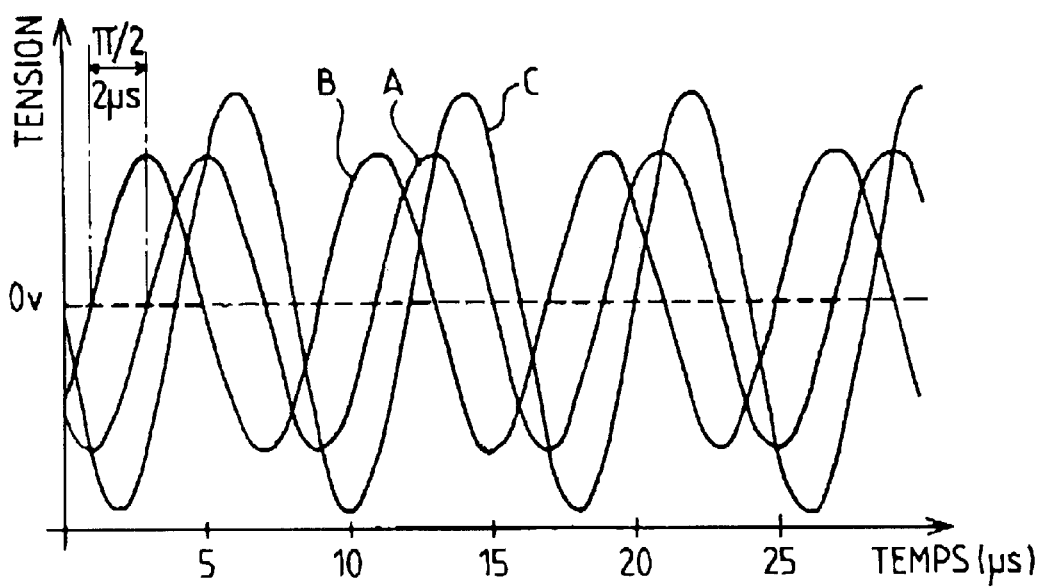
FIG. 3 is a graph showing the waveforms occurring in the circuit of FIG. 2.

In FIG. 3, the sinusoids A and B correspond to the voltages V1 and V2 respectively, these being phase-shifted by $\pi/2$ with respect to each other, while the sinusoid C corresponds to the difference voltage V1–V2.

Figure 4:
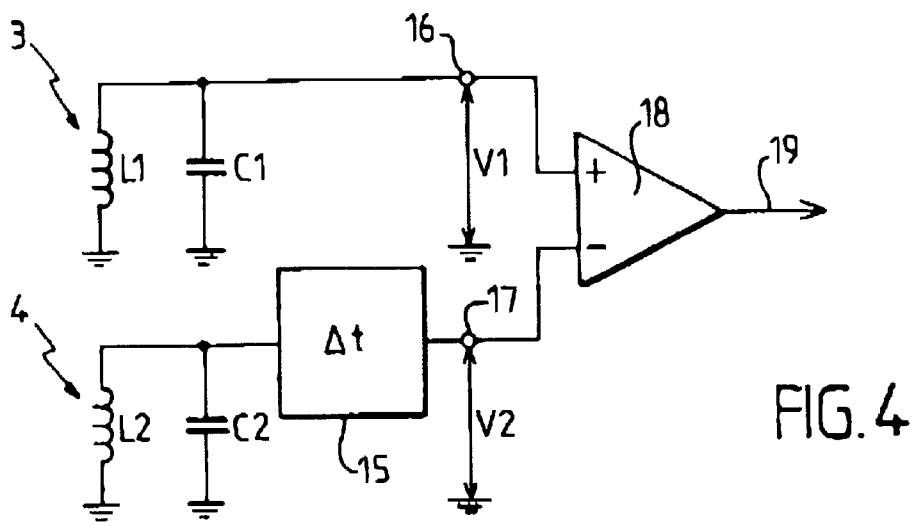
FIG. 4 is a circuit diagram showing a second embodiment of the phase shifter means that can be used in the portable receiver of FIG. 1.

FIG. 4 shows a second embodiment of the invention, again for a portable receiver 1 with two antennas 3 and 4, as illustrated in FIG. 1. In FIG. 4, the elements that are identical or that play the same role as in the embodiment in FIG. 2 are denoted by the same reference numbers and will not be described again in detail.

The embodiment in FIG. 4 differs from that in FIG. 2 in that the output of the tuned antenna 3 is connected directly to the output terminal 16, whereas the output of the tuned antenna 4 is connected to the output terminal 17 via a delay line 15 which is designed to introduce a delay $\Delta t$ of ¼f, f being the frequency of the signal to be received. For example, if f=125 kHz, $\Delta t$=2 µs. At the frequency f, this delay $\Delta t$ corresponds to a phase shift of $\pi/2$ in the voltage V2 with respect to the voltage V1. In this case, the same result as with the embodiment in FIG. 2 is therefore obtained.

The delay line 15 may be produced in any known manner, for example using inductors and capacitors.

Figure 5:
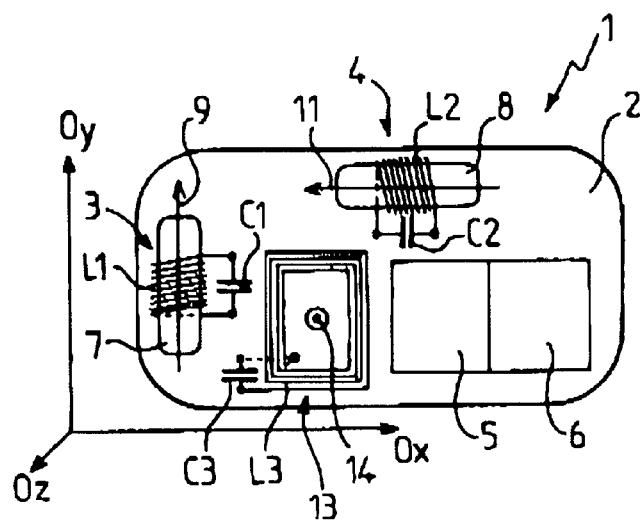
FIG. 5 illustrates, schematically, and in front view, a known three-antenna portable receiver to which the invention may be applied.
Figure 6:
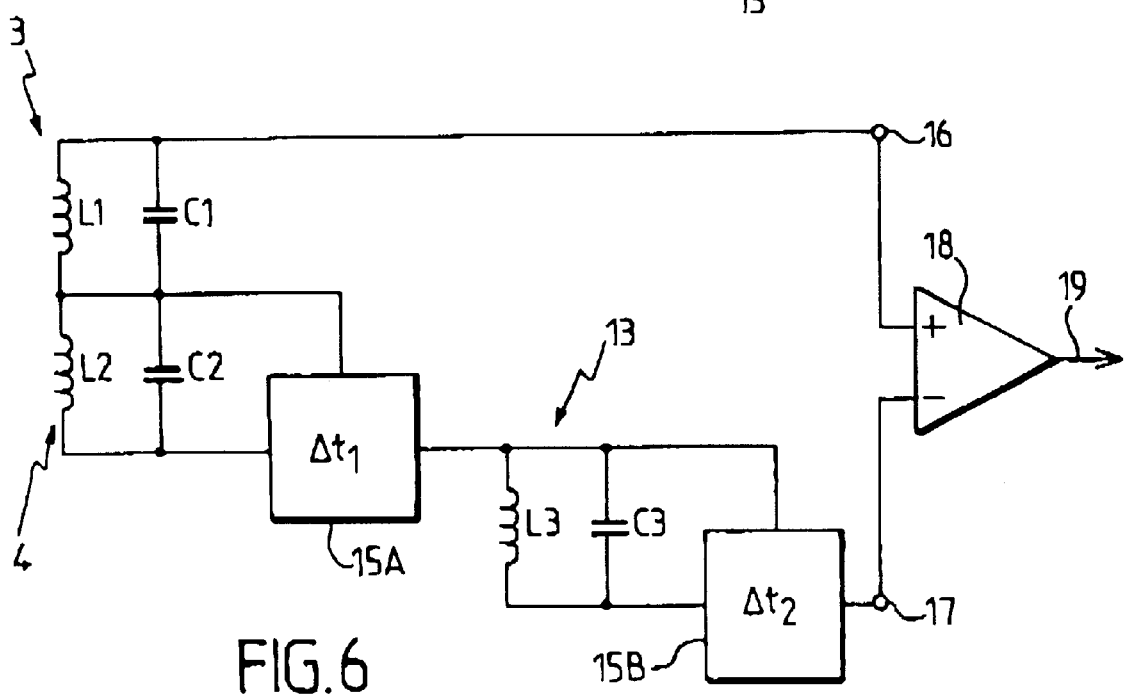
FIG. 6 is a circuit diagram showing a third embodiment of the invention in the case of the three-antenna portable receiver shown in FIG. 5.

FIG. 6 shows a third embodiment of the invention applicable to a known portable receiver 1, which has three antennas 3, 4 and 13, as shown in FIG. 5. In the embodiment in FIG. 6, the elements that are identical or that play the same role as those in the previous embodiments are denoted by the same reference numbers and will not be described again in detail.

In the embodiment in FIG. 6, one of the ends of the parallel resonant circuit formed by the coil L1 and the capacitor C1 (tuned antenna 3) is connected directly to the output terminal 16, while the other end of this parallel resonant circuit L1, C1 is connected to one of the ends of the parallel resonant circuit formed by the coil L2 and by the capacitor C2 (tuned antenna 4). The other end of the parallel resonant circuit L2, C2 is electrically connected via a first delay line 15A to one of the ends of a third parallel resonant circuit formed by the coil L3 and by the capacitor C3 (tuned antenna 13). The other end of this parallel resonant circuit L3, C3 is electrically connected to the output terminal 17 via a second delay line 15B.

The two delay lines 15A and 15B are designed to introduce a delay $\Delta t_1$ of ⅓f and a delay $\Delta t_2$ of ⅔f respectively, f being the frequency of the signal to be received. If the frequency f is equal to 125 KHz, the delays $\Delta t_1$ and $\Delta t_2$ are 2.66 µs and 5.33 µs respectively, these corresponding to phase-shift angles of $2\pi/3$ (120°) and $4\pi/3$ (240°).

Under these conditions, the voltage induced in the coil L2 and delayed by the delay line 15A is phase-shifted by 120° with respect to the voltage induced in the coil L1. The voltage induced in the coil L3 and delayed by the delay line 15B is phase-shifted by 240° with respect to the voltage induced in the coil L1 and by 120° with respect to the voltage induced in the coil L2. The difference voltage available across the terminals 16 and 17 is the vector sum of the three voltages induced in the coils L1, L2 and L3, respectively.

From the above text, it may be seen that, in the various embodiments of the invention that have just been described above, what is provided for solving the problem of how to achieve reception homogeneity is only a differential amplifier and one or two phase-shifter circuits, or a delay line in the case of a two-antenna receiver, and only a differential amplifier and two delay lines in the case of a three-antenna receiver, instead of three amplifiers and an adder or three amplifiers and a maximum detector circuit in the case of the known receiver described in document FR-A-2,763,186.

It goes without saying that the embodiments of the invention that have just been described above have been given purely by way of indication and imply no limitation, and that many modifications may be easily made by a person skilled in the art without in any way departing from the scope of the invention. Thus, in particular, the card 2, which carries the two antennas 3 and 4 or the three antennas 3, 4 and 13, the receiver unit 5, the transmitter unit 6 and the phase-shifting means 15 and the differential amplifier 18, does not necessarily have to have the dimensions of a smart card or credit card, but could consist of any other support, preferably a flat support, and this support may have small enough dimensions for it to be housed, for example, in the head of a contact key, allowing a motor vehicle to be started, in a badge or in any other article intended to be carried by the owner of the vehicle or by an authorized person.

What is claimed is:

1. A portable receiver comprising several antennas (3, 4) which are connected to a receiver unit (5) for receiving a signal transmitted by electromagnetic induction, said antennas being made in the form of coils (L1, L2) which are carried by a support (2) in such a way that the respective turns of said coils are oriented along different respective axes (9, 11) of a reference axis system associated with said support (2), as well as phase-shifting means (15) placed between said antennas (3, 4) and said receiver unit (5), wherein said phase-shifting means (15) are designed to produce, between the induced signals delivered by said antennas (3, 4) respectively, a temporal phase shift corresponding to an angle of $(n-1)\pi/n$ at the frequency of the signal to be received, n being the number of antennas.

2. The receiver as claimed in claim 1, which comprises two antennas (3, 4), the coils (L1, L2) of which have their respective turns oriented at 90° to each other, wherein a first (3) of the two antennas is connected to a first phase-shifter circuit (15a) which phase-shifts the induced signal delivered by the first antenna (3) by +45°, while the second antenna (4) is connected to a second phase-shifter circuit (15b) which phase-shifts the induced signal delivered by the second antenna by −45°.

3. The receiver as claimed in claim 2, wherein the first phase-shifter circuit (15a) comprises a first capacitor (C12), a first plate of which is electrically connected to the output of the first antenna (3), and a first resistor (R1), the ends of which are electrically connected to a second plate of the first capacitor (C12) and to ground respectively, the junction between the second plate of the first capacitor (C12) and the corresponding end of the first resistor (R1) being connected to a first output terminal (16).

4. The receiver as claimed in claim 3, wherein the second phase-shifter circuit (15b) comprises a second resistor (R2), a first end of which is electrically connected to the output of the second antenna (4), and a second capacitor (C22), the plates of which are electrically connected to a second end of the second resistor (R2) and to ground respectively, the junction between the second end of the second resistor (R2) and the corresponding plate of the second capacitor (C22) being connected to a second output terminal (17).

5. The receiver as claimed in claim 1, which comprises two antennas (3, 4), the coils (L1, L2) of which have their respective turns oriented at 90° to each other, wherein a first (3) of the two antennas is electrically connected directly to a first output terminal (16), while the second antenna (4) is connected to a second output terminal (17) via a phase-shifter circuit (15) which phase-shifts the induced signal delivered by the second antenna (4) by 90°.

6. The receiver as claimed in claim 5, wherein said phase-shifter circuit (15) is a delay line designed to introduce a delay ($\Delta t$) of ¼f, f being the frequency of the signal to be received.

7. The receiver as claimed in claim 1, which comprises three antennas (3, 4, 13), the coils (L1, L2, L3) of which have their respective turns oriented in directions (9, 11, 14) which are perpendicular to one another in pairs, wherein said temporal phase-shifting means (15) produces a phase shift of 120° between the three induced signals delivered by the three antennas (3, 4, 13) respectively.

8. The receiver as claimed in claim 7, wherein said phase-shifting means (15) comprise delay lines (15A, 15B).

9. The receiver as claimed in claim 8, wherein the coil (L1, L2 or L3) of each antenna (3, 4, or 13) is associated with a capacitor (C1, C2 or C3) which forms with said coil a parallel resonant circuit tuned to the frequency f of the signal to be received.

10. The receiver as claimed in claim 9, as it depends on claim 8, wherein a first parallel resonant circuit (L1, C1) formed with the coil (L1) of a first (3) of the three antennas (3, 4, 13) has a first end which is electrically connected to a first output terminal (16) and a second end which is electrically connected to a first of the two ends of a second parallel resonant circuit (L2, C2) formed with the coil (L2) of a second (4) of the three antennas, wherein the second end of the second parallel resonant circuit (L2, C2) is connected via a first delay line (15A) to a first of the two ends of a third parallel resonant circuit (L3, C3) which is formed with the coil (L3) of the third antenna (13) and the second end of which is connected via a second delay line (15B) to a second output terminal (17), and wherein the first and second delay lines (15A and 15B) are designed to introduce a delay ($\Delta t_1$) of ⅓f and a delay ($\Delta t_2$) of ⅔f respectively, f being the frequency of the signal to be received.

11. The receiver as claimed in claim 10, wherein the first and second output terminals (16 and 17) are electrically connected to the inputs of a differential amplifier (18), the output (19) of which is electrically connected to said receiver unit (5).

* * * * *